United States Patent [19]

Frost

[11] Patent Number: 5,046,998
[45] Date of Patent: Sep. 10, 1991

[54] TWO-WHEEL DRIVE MODE FOR FULL-TIME TRANSFER CASE

[75] Inventor: Barry L. Frost, DeWitt, N.Y.

[73] Assignee: New Venture Gear, Inc., Troy, Mich.

[21] Appl. No.: 437,066

[22] Filed: Nov. 16, 1989

[51] Int. Cl.⁵ .......................................... F16H 37/08
[52] U.S. Cl. .................................. 475/221; 475/225; 475/204; 180/247
[58] Field of Search ............... 475/221, 225, 250, 219, 475/210, 204; 180/250, 249, 248, 247; 192/111 B, 108

[56] References Cited

U.S. PATENT DOCUMENTS

| | | | |
|---|---|---|---|
| 3,627,072 | 12/1971 | Smirl | 475/225 X |
| 3,760,922 | 9/1973 | Rolt et al. | 192/111 B |
| 4,031,780 | 6/1977 | Dolan et al. | 475/85 |
| 4,074,591 | 2/1978 | Dick | 475/249 |
| 4,373,604 | 2/1983 | Lunn et al. | 192/48.5 |
| 4,381,828 | 5/1983 | Lunn et al. | 180/247 |
| 4,458,557 | 7/1984 | Hayakawa | 475/204 X |
| 4,484,654 | 11/1984 | Hayakawa | 180/248 X |
| 4,677,873 | 7/1987 | Eastman et al. | 180/204 |
| 4,677,875 | 7/1987 | Batchelor | 475/204 X |
| 4,876,919 | 10/1989 | Nagano et al. | 180/247 X |

FOREIGN PATENT DOCUMENTS

| | | | |
|---|---|---|---|
| 0076148 | 4/1983 | European Pat. Off. | 180/248 |
| 0176724 | 7/1988 | Japan | 180/247 |
| 0287631 | 11/1988 | Japan | 180/248 |

Primary Examiner—Leslie A. Braun
Assistant Examiner—Matthew Stavish
Attorney, Agent, or Firm—Harness, Dickey & Pierce

[57] ABSTRACT

A transfer case for a four wheel drive vehicle providing a drive range planetary gear set selectively positionable at a low speed output position, a high speed output position and a neutral position; having a dual planetary inter-axle differential gear set axially spaced from the range planetary gear set. The differential gear set is selectively positionable to provide a two-wheel drive mode to a first output and a full-time four-wheel drive mode with differential action between the first output and a second output. A viscous fluid clutch is selectively connected between the first and second outputs for modifying torque division therebetween whereby the viscous clutch is disconnected upon shifting into the two-wheel drive mode.

2 Claims, 3 Drawing Sheets

| TRANSFER CASE SHIFT POSITION | TITLE | RANGE CLUTCH | MODE CLUTCH |
|---|---|---|---|
| No. 1 | 2WH | POS. A | POS. X |
| No. 2 | 4WH FULL TIME | POS. A | POS. Y |
| No. 3 | NEUTRAL | POS. B | POS. X OR POS. Y |
| No. 4 | 4WL FULL TIME | POS. C | POS. Y |

TWO-WHEEL DRIVE MODE FOR FULL-TIME TRANSFER CASE

BACKGROUND OF THE INVENTION

This invention relates generally to vehicle transfer cases having a plurality of outputs and more particularly to a transfer case providing full-time four-wheel drive with a mode shift selection arrangement wherein viscous clutch means, operable to modify the torque division between the front and rear axles in the four-wheel drive mode, is disconnected in the two-wheel drive mode.

A number of prior vehicle drive train transfer cases have used planetary gear sets to selectively apply drive torque to one or two output shafts providing two-wheel or four-wheel drive. Reference may be made, for example, to U.S. Pat. No. 4,074,591 issued Feb. 21, 1978 to W. M. Dick and U.S. Pat. No. 4,677,873 issued July 7, 1987 to R. E. Eastman et al. which discloses a transfer case of this type.

It is common for such transfer cases, when operating in four-wheel drive mode during constant-speed driving, to provide means for selectively interlocking axles driven thereby preventing any slippage with respect to each other. It is also common for such transfer cases, when operating in four-wheel drive mode under certain other conditions, to provide means for differential action between respective axles permitting torque division and speed variations between the axles and thereby prevent potentially damaging torque buildup in the drive train.

Differential action is typically provided by a differential mechanism interconnecting one axle with the other. The above mentioned Eastman et al., patent discloses a compact dual planetary inter-axle differential without an annulus gear uniquely adapted for use with the present invention.

The U.S. Pat. No. 4,373,604 issued Feb. 15, 1983 to Lunn et al. and U.S. Pat. No. 4,381,828 issued May 3, 1983 to Lunn et al. disclose transfer cases adapted for use in four wheel drive vehicles having two-wheel drive and four-wheel drive operating modes. The Lunn et al., patents have an inter-axle differential incorporating a viscous fluid clutch which allows the front and rear sets of wheels to rotate independently under normal driving conditions but which transfers torque to the set of wheels which has higher traction when the other set of wheels slips. In full-time four-wheel drive transfer cases it is imperative that the viscous fluid clutch be disconnected upon shifting to the two-wheel drive mode to obviate a driving connection through the viscous clutch between the front and rear axles.

SUMMARY OF THE INVENTION

It is an object of the present invention to provide a vehicle transfer case providing full-time four-wheel drive including resistive fluid clutch means operative across an inter-axle differential of the transfer case including a shifting arrangement providing a two-wheel drive mode without the viscous clutch being operative.

It is still another object of the present invention to provide a transfer case as set forth above wherein said resistive clutch means is in the form of a viscous fluid clutch arranged in a compact space saving manner while avoiding off-axis moments of force.

In accordance with this object, the invention is embodied by a vehicle transfer case including an input adapted to be rotated about a central axis by an engine and also including first and second outputs to rotatively drive respective first and second axles. The improved construction of the present transfer case includes a first planetary gear set rotatively driven by the input, a second planetary gear set rotatively driven in response to the operation of the first planetary gear set, and a viscous fluid unit effectively connected between the first and second outputs such that it can be selectively disconnected in its two-wheel drive mode.

The first planetary gear set has a first, or low, operating position where the driven rotation of the input is communicated to the first output with speed reduction from planetary operation of the first planetary gear set. The first planetary gear set also has a second, or neutral, operating position where the driven rotation of the input is not conveyed beyond the first planetary gear set. The first additionally has a third, or high, operating position where the driven rotation of the input is communicated to the first output with no speed reduction from planetary operation of the first planetary gear set.

The second dual planetary differential gear set has a first, or two-wheel drive, operating position where the driven rotation of the central shaft is communicated to the first output only. The dual planetary gear set also has a second, or full-time, four-wheel drive, operating position where the driven rotation of the central shaft is communicated to the first and second outputs with differential action to provide inter-axle differential action. The first and second planetary gear sets are shifted to the positions just described in response to the actuation of a selector mechanism.

In the preferred construction disclosed, the first planetary gear set includes an annulus gear coaxially disposed about the central axis adjacent the input. A first planet gear carrier is disposed within the annulus gear and is also rotatable about the central axis. Planet gears, or planetary pinions, having axes concentrically parallel to the central axis are rotatably supported by the first planet gear carrier in a meshed relationship with the annulus gear. A sun, or input, gear rotatable about the central axis within the annulus gear and in meshed relationship with the planetary pinions is connected to the input. A forward quill sleeve, formed with external spline means, surrounds the central shaft for relative rotation therewith. A range clutch collar concentrically surrounds a portion of the forward quill sleeve and has internal splines slidably engaging the spline means such that the clutch collar is adapted to selectively connect the input shaft to the forward quill sleeve via the forward planetary gear set.

The aft dual planetary differential gear set includes a dual planetary carrier rotatable about the central axis. The dual planetary carrier includes forward and aft axially spaced carrier rings rotatable about the central shaft axis. The forward carrier ring has a central internally splined opening concentrically disposed about the central shaft. The forward quill sleeve has its aft end formed with external splines adapted for engaging the first carrier ring internal splines upon the dual planetary carrier being shifted rearwardly from its two-wheel drive mode to its four-wheel drive mode.

Rotatably supported by the aft planet gear carrier are fore and aft sets of planet gears, or differential pinions, having axes concentrically parallel to the central axis, the axis of the forward set of differential pinions being disposed at a greater radial distance from the central axis than are those of the aft set of differential pinions. The aft planetary gear set also includes forward and aft sun gears rotatable about the central axis. The forward and aft sun gears are respectively, in meshed relationship with the forward and aft set of differential pinions, which are in meshed relationship with each other.

A central shaft is rotatably supported by, and extends along the central axis of, the transfer case. The forward end of the central shaft is located adjacent the input of the transfer case, and the aft end constitutes the first output of the transfer case. The central shaft extends through both the forward and the aft planetary gear sets. An aft quill sleeve, which concentrically surrounds the central shaft for relative rotation therewith, has its forward end axially spaced by a drive ring from the forward quill sleeve aft end. A chain sprocket is splined on a rearwardly extending hub portion of the aft sun gear and is adapted to drive a second output of the transfer case.

These and other objects and advantages of the present invention will be readily apparent by reference to the following description of the preferred embodiment and appended drawings.

DETAILED DESCRIPTION OF THE INVENTION

Figures 1A, 3:
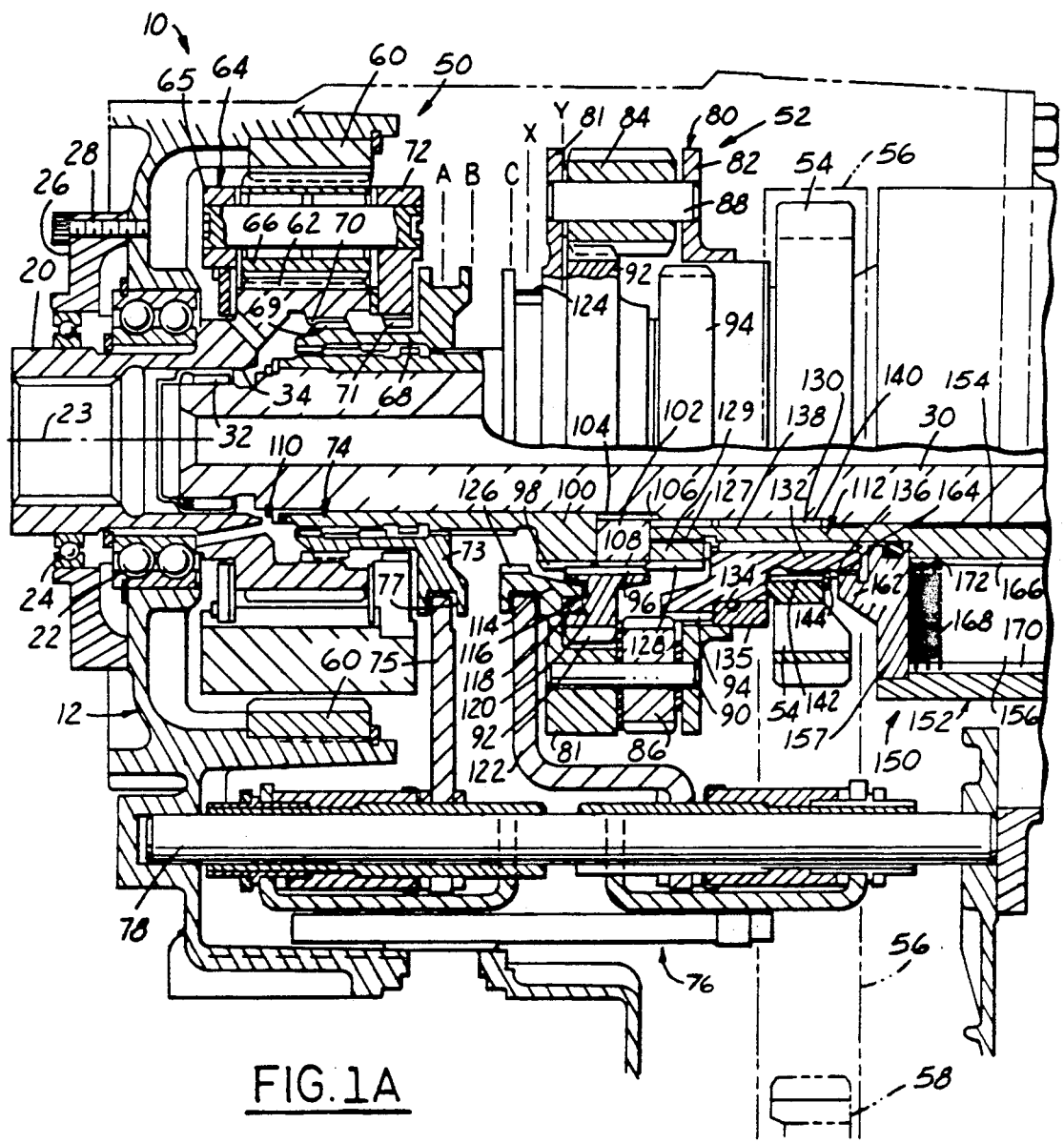
FIGS. 1A, 1B, and 1C are longitudinal, sectional views of a transfer case for a full time four-wheel drive vehicle, constructed in accordance with the present invention, showing the transfer case shifted to its two wheel drive mode.
FIG. 3 is a table listing the transfer case shift position versus the position table, range clutch position and mode clutch position.
Figure 1B:
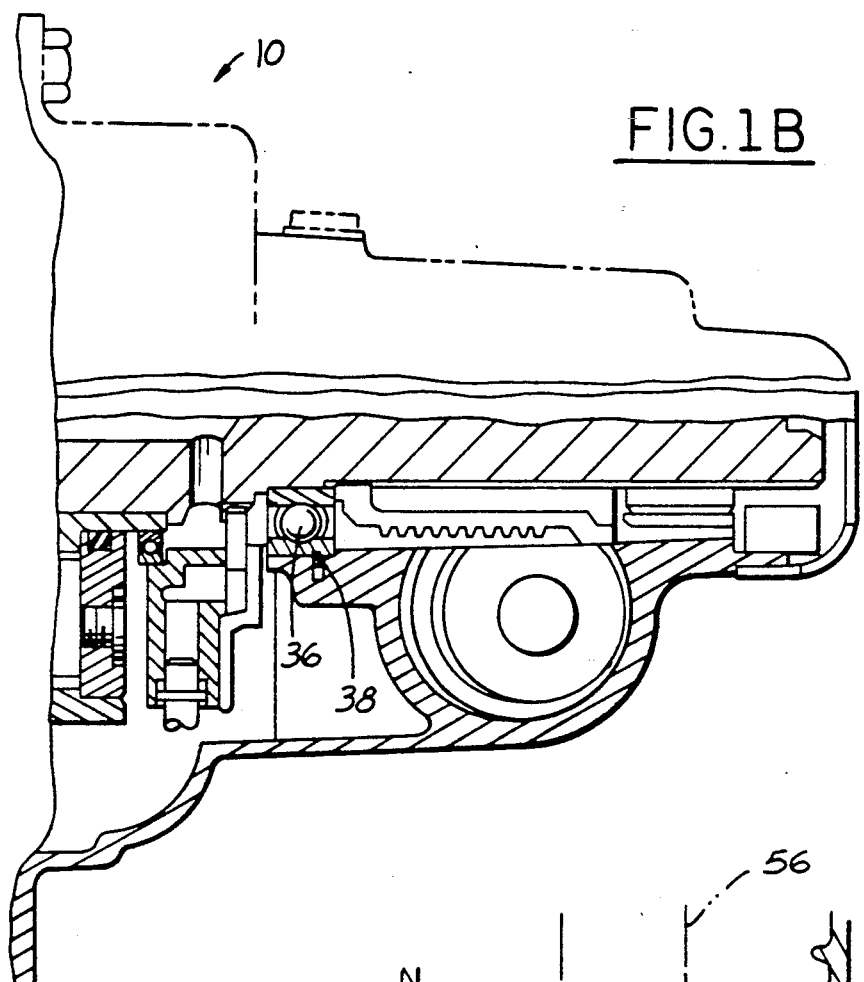
Figure 1C:
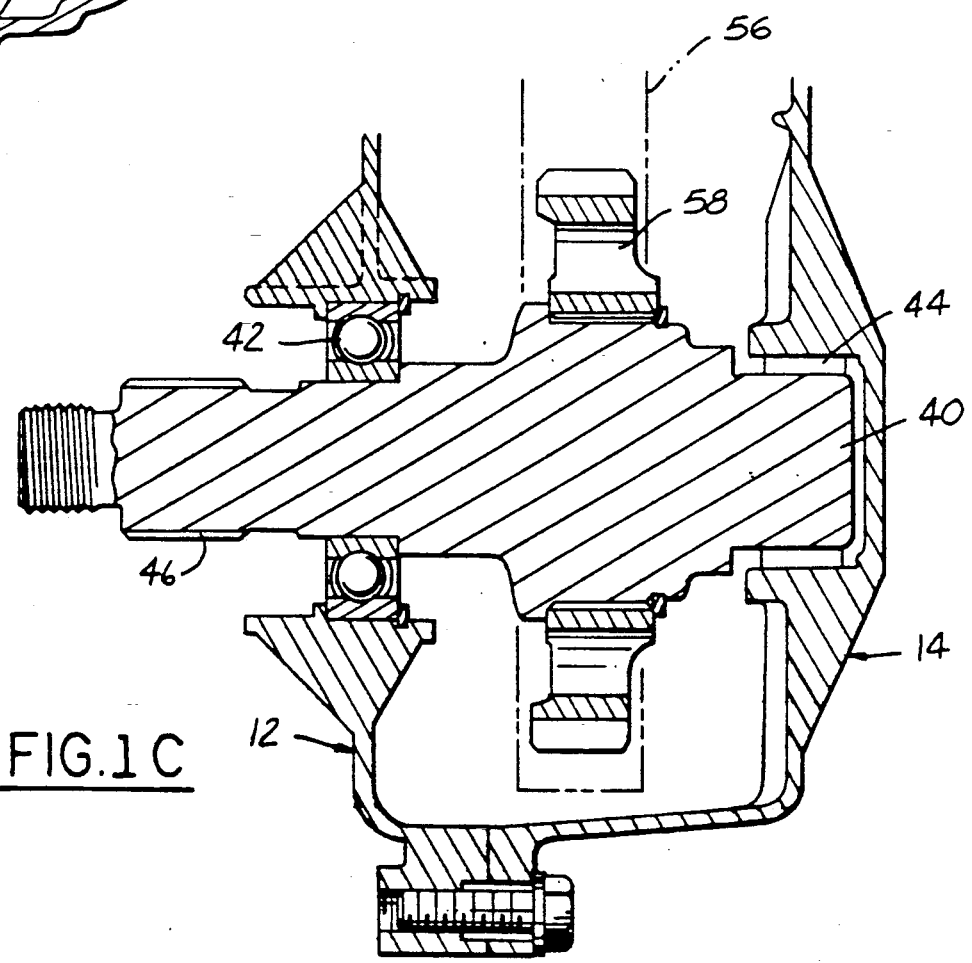

With reference to FIGS. 1A, 1B, and 1C of the drawings, a vehicle transfer case constructed in accordance with the present invention is generally indicated by the reference numeral 10 and includes a casing having front 12 and rear 14 casing members secured to each other by bolts 16 (only one of which is shown).

The transfer case 10 includes an input shaft 20 which is rotatively supported on the front housing member 12 by an input bearing 22 for rotation about a central axis 23. The input shaft is adapted to be rotatively driven, typically through an intermediate transmission, by an associated vehicle engine (neither of which are shown). The input shaft 20 is sealed within the front casing member 12 by an input shaft oil seal 24 and is retained by an input shaft retainer 26 secured by a set of bolts 28 (only one of which is shown).

The transfer case 10 also includes a first output in the form of a rear axle output or central shaft 30 rotatively supported in the transfer case 10 by a front bearing 32, located within an axially aligned bore 34 in the rearwardly facing end of the input shaft 20. The central shaft 30 is supported and retained by a rear bearing 36 (FIG. 1B), and is, in turn retained by a bearing retaining snap ring 38. The central shaft extends along axis 23 and is adapted for connecting to a drive shaft (not shown) to drive the rear axle of a vehicle.

FIG. 1C shows a second output in the form of a forwardly extending front axle offset output shaft 40 which is rotatively supported and retained in the transfer case 10 by a front bearing 42, located in the front housing member 12. The offset output shaft 40 is supported by a rear bearing 44 located in the housing member 14. An output shaft yoke (not shown) is adapted to be secured to forward splines 46 of the offset output shaft 40 and is adapted for connecting to a front drive shaft (not shown) to drive the front wheels of the vehicle.

The transfer case 10 includes a forward planetary reduction gear set 50 rotatively driven about the central axis 23 by the input shaft 20 and also includes an aft inter-axle dual planetary differential gear set 52 rotatively driven about the central axis 23 in response to the operation of the forward planetary gear set 50. The forward planetary reduction gear set 50 and the aft planetary differential gear set 52 are of the general types shown in above mentioned U.S. Pat. No. 4,677,873.

As will be described in more detail, the forward planetary gear set 50 has a first, or low, operating position where the driven rotation of the input shaft 20 is communicated to the rear output shaft 30 with speed reduction from planetary operation of the forward planetary gear set 50. The forward planetary gear set 50 also has a second, or neutral, operating position where the driven rotation of the input shaft 20 is not conveyed beyond the forward planetary gear set 50. The forward planetary gear set 50 additionally has a third, or high, operating position where the driven rotation of the input shaft 20 is communicated to the center output shaft 30 with no speed reduction from planetary operation of the forward planetary gear set 50.

The aft dual planetary differential gear set 52 has a first or two-wheel drive, operating position where the driven rotation of the central shaft 30 is communicated to the rear drive shaft and rear wheels only. The dual planetary gear set 52 has a second, full-time four-wheel drive, operating position where the driven rotation of the central shaft 30 is communicated to the front and rear drive shafts with interaxle differential action. The forward 50 and aft 52 planetary gear sets are shifted in response to the actuation of a selector mechanism to be described. It will be noted in FIGS. 1A and 1C that the front output shaft 40 is driven buy a drive sprocket 54 meshed with a schematically illustrated drive chain 56 that is, in turn, meshed with a driven sprocket 58 (FIG. 1C) on the front output shaft 40.

The forward planetary gear set 50 includes an annulus gear 60 fixedly supported by the front housing member 12 and coaxial with the central axis 23, a sun gear 62 integral with and rotatively driven about the central axis 23 within the annulus gear 60 by the input shaft 20. A planet carrier 64 has a forward carrier ring 65 rotatable about the central axis 23 and rotatably supports planetary pinions 66 that mesh with the sun gear 62 and the annulus gear 60.

A range clutch shift collar 68 is coaxially affixed around the central output shaft 20 and has external splines 69 for selective slidable engagement with internal splines 70 on integral sun gear 62 and internal splines 71 on aft carrier ring 72 of the planetary 50. The range shift collar 68, formed with a radial flange 73 at its aft end, is splined to and slidable along a forward quill sleeve 74 under the urging of a first range shift fork 75 of a selector mechanism 76. The range shift fork 75, engaged in an annular groove 77 in the shaft collar flange 73, is slidable on a shift rail 78 extending parallel to the central axis 23 and supported in the housing members in a conventional manner. It will be noted that the forward quill sleeve 74 is coaxially disposed about the output central shaft 30 in a journalled manner for relative rotation thereto.

The range shift collar 68 is selectively positionable by the shift fork 75 to a position "C" whereby its external splines 69 engage aft carrier internal splines 71 thereby placing the forward planetary gear set 50 in a first, or low, operating position where a driven rotation of the input shaft 20 is communicated to the central output shaft 30 with speed reduction from planetary operation of the forward planetary gear set 50.

The range shift collar 68 is also selectively slidable by the first shift fork 76 to a position "B" whereby its external splines 69 do not engage any associated gears or splines, thereby placing the forward planetary gear set 50 in a second, or neutral, operating position where a driven rotation of the input shaft 20 is not conveyed beyond the forward planetary gear set 50. The range shift sleeve 68 is also selectively slidable by the first shift fork 76 to a position "A" where its external splines 69 engage the integral sun gear internal splines 70 thereby placing the first planetary gear set 50 in a third, or high, operating position where a driven rotation of the input shaft 20 is communicated to the rear drive shaft and rear axle with no gear reduction.

In the preferred construction, the dual planetary differential gear set 52 includes a carrier 80, comprising forward carrier member 81 and an aft carrier member 82, rotatable and axially shiftable about the central axis 23 and rotatably supporting a first set of full-length planet gears 84 and a second set of half-length of planet gears 86. The full-length planet gears 84 are journally supported on first pins 88 while the half-length planet gears 86 are journally supported on second pins 90 having axes concentrically parallel to the central axis 23. The axes of the first set of pins 88 are disposed at a greater radial distance from the central axis 23 than are the axes of the second set of pins 90.

The dual planetary gear set 52 also includes forward 92 and aft 94 sun gears that are rotatable about the central axis 23 and are respectively in meshed relationship with the first full-length 84 and second half-length 86 set of differential planet gears, which are in meshed relationship with each other.

The forward sun gear 92 central bore is formed with internal splines 96 slidably engaged with external splines 98 located on aft radial hub portion 100 of the forward quill sleeve 74. With reference to FIG. 1A it will be seen that a spacer drive ring 102 is coaxially affixed on the central output shaft 30 by means of its internal splines 104 engaged with external splines 106 formed on the central shaft 30. The external splines 98 of the forward quill sleeve 74 are axially aligned with external splines 108 formed on the drive ring 102 such that the forward sun gear internal splines 96 slidably engage both the external splines 98 and 108 with the forward sun gear 92 shifted forwardly to its position shown in FIG. 1A. It will be appreciated that the forward quill sleeve forward end is axially positioned on the output shaft 30 by snap ring 110. Accordingly, the drive ring 102 is axially retained between the aft end of the forward quill sleeve 74 and the forward end of an aft quill sleeve 112 concentrically journalled on the central shaft 30.

FIG. 1A shows the forward carrier member 81 formed with an annular rearwardly extending flange portion 114 providing an external annular race shoulder 116 supporting a circular bearing 118 disposed concentrically about the central axis 23. The bearing 118 exterior surface is journally engaged with undercut interior race 120 formed in the forward sun gear 92.

A second mode shift fork 122 of the shift mechanism 76 is engaged in annular groove 124 formed in the forward carrier member 81. Thus, the dual planetary gear set carrier 80 is axially slidable under the urging of the selector mechanism 76 from a two-wheel drive mode of FIG. 1A to a full-time four-wheel drive mode of FIG. 2. It will be seen in FIG. 1A that the forward carrier member 81 defines a circular opening concentric with the central axis 23 formed with internal splines 126 axially aligned with the forward sun gear internal splines 96.

Figure 2:
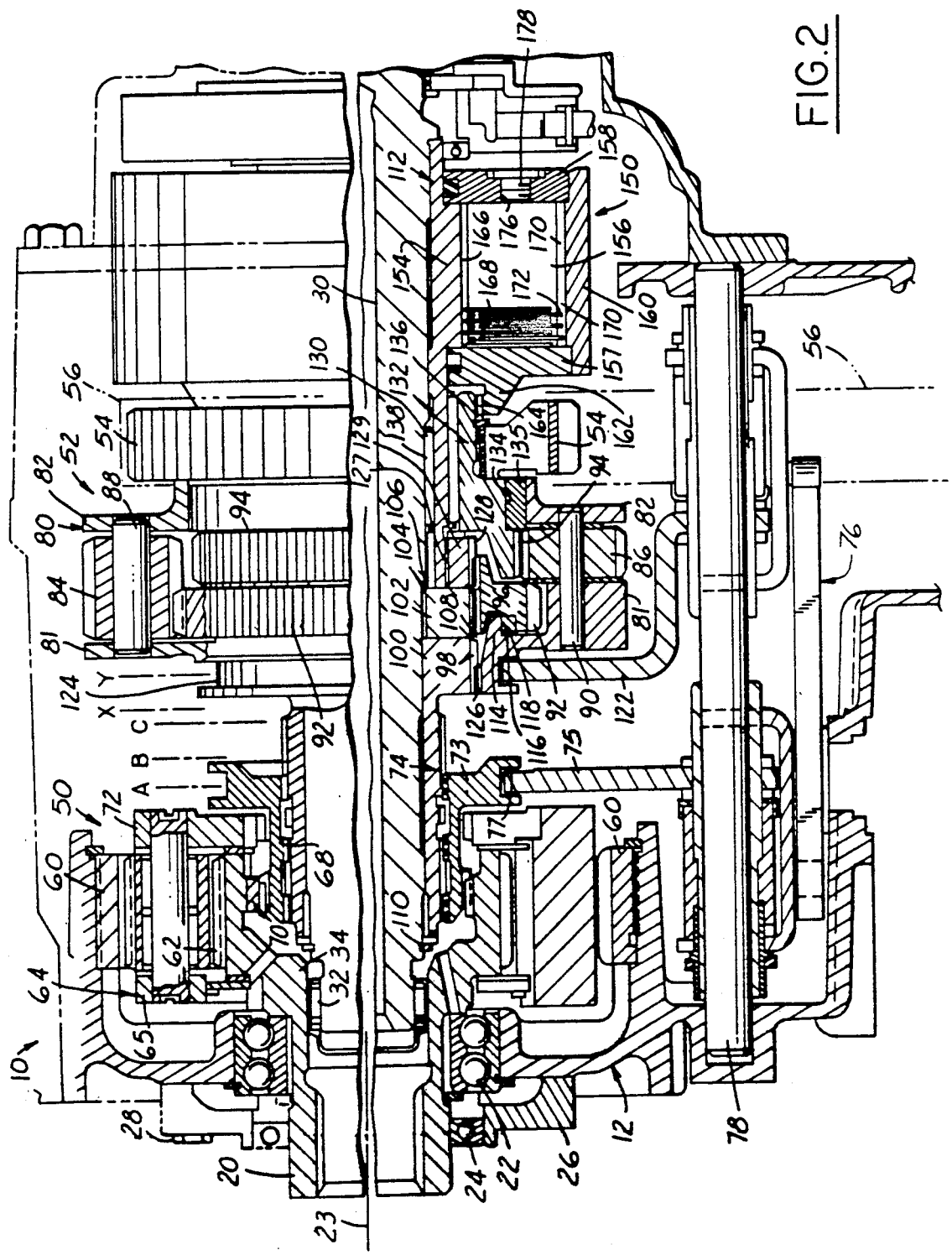
FIG. 2 is a view similar to FIG. 1A showing the transfer case shifted to its four-wheel drive mode.

Thus, upon the dual planetary carrier 80 being shifted rearwardly to its FIG. 2 position the forward carrier member internal splines 126 engage the external splines 98 of the forward quill sleeve 74. At the same time the forward sun gear internal splines 96 are shifted rearwardly disengaging the forward quill sleeve external splines 98 and engaging external splines 128 located on the forward radially enlarged end 129 of the aft quill sleeve 112. It will be seen in FIG. 1A that the aft quill sleeve is concentric with the central axis 2 and journally supported thereon by bearings 130 for relative rotation on the central output shaft 30. Further, the radially enlarged end 129 of the aft quill sleeve 112 could be splined by internal and external splines at 127, if desired, for assembly purposes.

With reference to FIG. 2 it will be appreciated that upon the forward sun gear 92 being shifted rearwardly its internal splines 96 are disengaged from the forward quill sleeve splines 98. At the same time, while forward sun gear internal splines 96 remain in continued engagement with the external splines 108 of the drive ring 102, the splines 96 are moved into engagement with the aft quill sleeve external splines 128.

In FIG. 2 it will be noted that the aft sun gear 94 is formed with an axially extending cylindrical flange extension 132 concentrically disposed about the central axis 23. The aft sun gear flange extension 132 has a forward stepped portion defining a journal shoulder 134 seating a circular bearing 135 concentric with the central axis 23. Further, the flange extension 132 is formed with external splines 136. The aft sun gear 94 has its central bore 138 journally supported on the aft sleeve 112 by means of roller bearings 140 for rotation about the central axis 23. The drive sprocket 54 has internal splines 142 which engage the aft sun gear external splines 136 and is retained thereon by snap ring 144 so as to carry the drive sprocket 54 for rotation therewith.

A viscous coupling or clutch unit, generally indicated at 150 in FIG. 1A and 2, is positioned rearwardly of the second sun gear extension flange 132. The viscous clutch unit 150 includes an outer housing 152 rotatable secured to an inner housing defined by the aft thickened extension 154 of the aft quill shaft 112. The inner 152 and outer 154 housings define a fluid chamber 156 therebetween. FIG. 2 shows the outer housing 152 comprising annular front and rear end cover plate portions 157 and 158, respectively, closing the ends of cylindrical outer drum portion 160. The front cover plate includes an integral forwardly projecting annular neck section 162 formed with an internally splined opening 164 concentrically disposed about the central axis 23. The internally splined opening 164 engages the external splines 136 on the second sun gear extension flange 132 and is rotatable therewith about the central axis 23.

The inner housing portion is defined by and integral with a rear sleeve 112 portion formed with external splines 166. The external splines 166 mount a plurality of viscous coupling inner plates 168. The inner plates 168 are flat annular ring-shaped members having splines at their inner periphery which drivingly engage the aft sleeve external splines 166. The outer drum 160 has internal splines 170 which mount a plurality of second viscous coupling outer plates 172. The plates 172 are flat annular rings having splines at their outer periphery which drivingly engage the outer drum internal splines 170. The selected number of inner set of rear sleeve plates 168 are alternately interleaved with the outer drum set of plates 172 and float between the latter in the viscous fluid chamber 156. The plates 168 and 172 are similar to the plates discloses in U.S. Pat. Nos. 3,760,922 and 4,031,780, the disclosures of which are incorporated by reference herein.

When the chamber 156 is filled with viscous fluid (not shown) admitted by way of a filling hole 176 closed by a sealed plug 178. The viscous clutch 150 modifies the torque division between the first and second transfer case outputs, i.e. center output shaft 30 and offset output shaft 40, respectively, whenever the torque being applied to an output shaft exceeds the required amount for operating that output shaft under existing conditions of traction. If the loads on the center and offset shafts are not the same because a wheel loses traction and spins, the dual pinion differential 52 carrier members 80 and 82 and the second sun gear 94 rotate about the central axis 23 at different rates. The pinions 86 of the second dual planetary gear set responds to this difference in rotation rates by allowing the differential pinions 84 to rotate with respect to the differential pinions 86, the first sun gear 92 being rotated with respect to the aft sun gear 94 in response thereto. Since the spinning wheel and the rotating forward sun gear 92 represent almost no load, little torque will be applied to the axle associated with the spinning wheel. The viscous clutch 150 introduces a load sufficient to ensure that adequate torque is applied to the output shaft connected to the spinning wheel.

With reference to the chart of FIG. 3, with the mode clutch 74 moved to its position "X" by shift fork 122 the dual planetary gear set forward carrier 81 is positioned in its two-wheel drive mode in that its internal splines 126 are disengaged from the external splines 98 of the forward quill sleeve 74. In the two-wheel drive mode the output from the high/low range forward planetary 50 is connected to the forward quill sleeve 74 and thence by the forward quill external splines 98 connected to the internal splines 96 of the forward sun gear 92. As the forward sun gear internal splines 96 are also connected to the external splines 108 of the drive ring 102 the output of the high/low range planetary 50 is connected to the central output shaft 30 driving only the vehicle rear axle and rear wheels.

Upon shifting the carrier 80 of the interaxle dual planetary differential 52 rearward to the four-wheel drive "Y" position by means of the mode shift fork 122 the carrier internal splines 126 engage the forward quill sleeve external splines 98. Further, the forward sun gear internal splines 96 are disengaged from the forward quill sleeve external splines 98 and now engage the drive ring external splines 108 together with the external splines 128 of the aft quill sleeve 112. As the aft quill sleeve 112 is integral with the viscous clutch inner housing 154 shifting the dual planetary carrier 80 rearwardly to its full-time four-wheel drive mode connects the viscous coupling inner housing 154 and the dual planetary differential carrier 80,82 into meshing engagement with the center output shaft 30 via the aft quill sleeve. Further, the output of the high/low range planetary, via the forward quill sleeve 74, is connected to the forward carrier member 81 of the dual planetary differential 52. This FIG. 2 shift arrangement places the transfer case into its full-time four-wheel drive mode with the viscous clutch unit 150 connected between the center output shaft 30 and the offset output shaft 40 so as to modify the torque division therebetween during wheel slip conditions. By means of the present invention upon shifting the transfer case back to its two-wheel drive mode the viscous clutch unit 150 is disconnected. This obviates a connection between the center output shaft 30 and the offset output shaft 40 through the viscous drive unit 150 in two-wheel drive mode of the vehicle.

While only one embodiment of the present invention has been described, other embodiments and modifications are possible without departing from the scope of the appended claims. For example, other resistive or friction type clutches could be used in place of the viscous fluid clutch shown. Thus, a drag disk clutch having friction disks could be substituted for the viscous fluid clutch 150 without department from the scope of the invention.

What is claimed is:

1. A vehicle transfer case having an input adapted to be rotatably driven about a central axis by an engine and also having first and second outputs that rotatively drive first and second axles, respectively, the transfer case comprising:

a casing;

an input shaft rotatably supported by said casing along the central axis and adapted to be rotatively driven by the input, said input shaft having a front end and an aft end, said front end thereof being disposed adjacent the input of the transfer case;

an input sun gear of a forward planetary gear set connected to said input shaft to rotate therewith;

a central shaft rotatably supported by said housing along the central axis, said central shaft having a front end and an aft end, said front end thereof being disposed adjacent said aft end of said input shaft and said aft end thereof constituting the first output of the transfer case;

a forward quill sleeve concentrically surrounding said central shaft for relative rotation therewith and having first external spline means formed thereon;

a range clutch collar concentrically surrounding a forward portion of said forward quill sleeve and having internal spline means slidably engaging said first external spline means of said forward quill sleeve such that said range clutch collar being adapted to selectively connect said input shaft to said forward quill sleeve via said forward planetary gear set;

said forward planetary gear set being rotatively driven by said input sun gear and having a first operating range where the planetary operation thereof about the central axis provides driving of said central shaft, and therewith, said first output with speed reduction, said first planetary gear set having a second operating range where no driving of said central shaft is provided, said forward planetary gear having a third operating range where driving of said central shaft is provided with no speed reduction from planetary operation of said forward planetary gear set;

an aft dual planetary differential gear set disposed coaxially in a concentric manner about said central shaft, said aft differential gear set comprising a dual planetary carrier including forward and aft longitudinally spaced interconnected carrier rings rotatable about the central axis, said forward carrier ring having a central internally splined bore concentrically disposed about said central shaft and an aft portion of said forward quill sleeve, forward and aft sun gears concentrically disposed about said central shaft, said aft sun gear having its teeth at a first uniform radius with said forward sun gear having its teeth at a first uniform radius a predetermined distance greater than said aft sun gear teeth radius, first and second sets of pinion gears having identical uniform diameters rotatably supported on first and second, respective, sets of pins disposed parallel to the central axis, said first and second sets of pins journalled between said carrier forward and aft rings at first and second radial distances, respectively, outward from the central axis, wherein said first radial distance is a predetermined distance greater than said second radial distance, said first and second sets of pinion gears disposed in paired relationship such that each said first set pinion gear teeth meshingly engage a corresponding second set pinion gear teeth, the improvement wherein;

said aft portion of said forward quill sleeve having a radial hub portion formed with second external spline means adapted for slidably engaging said forward carrier member internal splines;

an aft quill sleeve concentrically surrounding said central shaft for relative rotation therewith and having its front end separated a predetermined axial distance by a spacer ring from said forward sleeve aft end, said spacer ring concentrically fixed to said central shaft for rotation therewith and having external spline means alignable with said forward quill sleeve second spline means, said aft quill shaft front end formed with external splines alignable with said spacer ring external spline means;

means for shifting said aft planetary gear set carrier and its forward sun gear axially relative to said forward quill shaft, said spacer ring and said aft quill sleeve between a forward two-wheel drive operating mode and a rearward full-time four-wheel drive operating modes;

said shifting means adapted to cause said forward carrier member internal splines to meshingly engage said second spline means on said forward quill sleeve in said four-wheel drive mode, and wherein said forward carrier member internal splines are disengaged from said forward quill sleeve second spline means in said two-wheel drive mode;

said differential gear set forward sun gear having internal splines of predetermined axial length such that they slidably engage said external spline means on both said spacer ring and said radial hub portion of said forward quill sleeve in said two-wheel drive operating mode, and said forward sun gear internal splines slidably engaging both said spacer ring external spline means and said aft quill sleeve forward end external splines in said full-time four-wheel drive operating mode;

said aft sun gear of said aft differential gear set having a rearwardly extending flange concentrically surrounding a forward portion of said aft quill sleeve, said aft sun gear flange formed with external splines engaging an internally splined axial bore of a drive sprocket concentrically surrounding a portion of said flange, chain means connecting said drive sprocket with an offset output shaft constituting the second output of the transfer case;

a resistive clutch comprising an inner housing, defined by an aft end portion of said aft quill sleeve, and an outer housing rotatable relative to said inner housing, said outer housing secured to said aft sun gear flange and being rotatable therewith, whereby with said transfer case aft planetary differential gear st in said full-time four-wheel drive operating mode said resistive clutch is operative to modify torque division between said central shaft and said offset shaft in response to variations in respective rotation speeds of said central shaft and said offset shaft; and whereby with said transfer case aft planetary differential gear set in said two-wheel drive operating mode said resistive clutch is disconnected from said central output shaft for obviating a driving connection between said outer and inner housings.

2. A vehicle transfer case having an input adapted to be rotatably driven about a central axis by an engine and also having first and second outputs that rotatively drive first and second axles, respectively, the transfer case comprising:

a casing;

an input shaft rotatably supported by said casing along the central axis and adapted to be rotatively driven by the input, said input shaft having a front end and an aft end, said front end thereof being disposed adjacent the input of the transfer case;

an input sun gear of a forward planetary gear set connected to said input shaft to rotate therewith;

a central shaft rotatably supported by said housing along the central axis, said central shaft having a front end and an aft end, said front end thereof being disposed adjacent said aft end of said input shaft and said aft end thereof constituting the first output of the transfer case;

a forward quill sleeve formed with first external spline means concentrically surrounding said central shaft for relative rotation therewith;

a range clutch collar concentrically surrounding a forward portion of said forward quill sleeve and having internal spline means slidably engaging said forward quill sleeve first external spline means such that said range clutch collar is adapted to selectively connect said input shaft to said forward quill sleeve via said forward planetary gear set;

said forward planetary gear set being rotatively driven by said input sun gear and having a first operating range where the planetary operation thereof about the central axis provides driving of said central shaft, and therewith, said first output with speed reduction, said planetary gear set having a second operating range where no driving of said central shaft is provided, said forward planetary gear having a third operating range where driving of said central shaft is provided with no speed reduction from planetary operation of said forward planetary gear set;

an aft dual planetary differential gear set disposed concentrical coaxially about said central shaft, said aft differential gear set comprising a dual planetary carrier including forward and aft longitudinally spaced interconnected carrier members rotatable about the central axis, said forward carrier member having a central internally splined bore concentrically disposed about said central shaft and an aft portion of said forward quill sleeve, forward and aft sun gears concentrically disposed about said central shaft, said dual planetary carrier and said forward sun gear adapted for axial movement relative to said aft sun gear, said aft sun gear having its teeth at a first uniform radius with said forward sun gear having its teeth at a first uniform radius a predetermined distance greater than said aft sun gear teeth radius, first and second sets of pinion gears having identical uniform diameters rotatably supported on first and second, respective, sets of pins disposed parallel to the central axis, said first and second sets of pins journalled between said carrier forward and aft members at first and second radial distances, respectively, outward from the central axis, wherein said first radial distance is a predetermined distance greater than said second radial distance, said first and second sets of pinion gears disposed in paired relationship such that each said first set pinion gear teeth meshingly engaging a corresponding second set pinion gear teeth, the improvement wherein;

said aft portion of said forward quill sleeve having second external splines adapted for slidably engaging said forward carrier member internal splines;

an aft quill sleeve concentrically surrounding said central shaft for relative rotation therewith and having its forward end formed with first external splines;

a spacer ring concentrically fixed to said central shaft for rotation therewith, said spacer ring positioned intermediate said forward and aft quill sleeves and having external splines formed thereon which are alignable with said second external splines on said forward quill sleeve and said aft quill sleeve external splines;

means for axially shifting said aft dual planetary carrier and said forward sun gear axially relative to said forward quill sleeve, said spacer ring and said aft quill sleeve between a forward two-wheel drive mode and a rearward full-time four-wheel drive mode;

said shifting means adapted to cause said forward carrier member internal splines to meshingly engage said second splines on said forward quill sleeve in said four-wheel drive mode, and wherein said forward carrier member internal splines are disengaged from said forward quill sleeve second splines in said two-wheel drive mode;

said differential gear set forward sun gear having internal splines of predetermined axial length for slidably engaging external splines on both said spacer ring and said aft portion of said forward quill sleeve in said two-wheel drive operating mode, and said forward sun gear internal splines slidably engaging both said spacer ring external splines and said aft quill sleeve first external splines in said full-time four-wheel drive operating mode;

said aft sun gear of said aft differential gear set having a rearwardly extending flange concentrically surrounding a forward portion of said aft quill sleeve, said aft sun gear flange formed with external splines engaging an internally splined axial bore of a drive sprocket concentrically surrounding a portion of said flange, chain means connecting said drive sprocket with an offset output shaft constituting the second output of the transfer case;

a viscous fluid clutch comprising an inner housing, defined by an aft end portion of said aft quill shaft, and an outer housing rotatable relative to said inner housing so as to define a sealed chamber containing viscous fluid therebetween, said outer housing secured to said aft sun gear flange and being rotatable therewith, a plurality of parallel clutch plates extending from said inner housing into said chamber, and a plurality of parallel clutch plates extending from said outer housing into said chamber and intermeshing with said clutch plates extending from said inner housing;

whereby with said transfer case aft planetary differential gear set in said full-time four-wheel drive mode said viscous clutch operative to modify torque division between said central shaft and said offset shaft in response to variations in respective rotation speeds of said central shaft and said offset shaft; and whereby with said transfer case aft planetary differential gear set in said two-wheel drive mode said viscous clutch is disconnected from said central output shaft for obviating a driving connection between said outer and inner housings.

* * * * *